(12) United States Patent
Garcia Sacristan

(10) Patent No.: US 7,566,030 B2
(45) Date of Patent: Jul. 28, 2009

(54) ROTATION FITTING FOR THE EMPENNAGE OF AN AIRCRAFT

(75) Inventor: Angel Garcia Sacristan, Madrid (ES)

(73) Assignee: Airbus Espana, S.L., Madrid (ES)

( * ) Notice: Subject to any disclaimer, the term of this patent is extended or adjusted under 35 U.S.C. 154(b) by 538 days.

(21) Appl. No.: 11/499,561

(22) Filed: Aug. 4, 2006

(65) Prior Publication Data
US 2007/0147953 A1 Jun. 28, 2007

(30) Foreign Application Priority Data
Dec. 26, 2005 (ES) ................................ 200503191

(51) Int. Cl.
B64C 9/02 (2006.01)
(52) U.S. Cl. .......................................... 244/87; 16/223
(58) Field of Classification Search ................... 244/87, 244/88, 90 R; 16/223, 249, 309, 387
See application file for complete search history.

(56) References Cited
U.S. PATENT DOCUMENTS
3,016,827 A * 1/1962 Boyd .......................... 102/384
4,247,061 A * 1/1981 Kuczynski et al. ........ 244/17.19
4,414,704 A * 11/1983 Reuter .......................... 16/223
4,598,889 A * 7/1986 Remington ................... 244/87
6,810,563 B1 * 11/2004 Domenig et al. .............. 16/387

* cited by examiner

Primary Examiner—Rob Swiatek
(74) Attorney, Agent, or Firm—Klauber & Jackson, LLC

(57) ABSTRACT

Rotation fitting secured to a frame (6) of the fuselage of an aircraft and linked to a receiving element secured to the empennage (5) which comprises a central fitting (1) and two side fittings (2,3), the central fitting (1) presenting two lugs (1d,1k) with an opening (1e,1j) each and four side wings (1g,1f,1i,1h), and each one of the side fittings (2,3) presenting a lug (2d,3d) with an opening (2e,3e) each and two side wings (2g,2f,3g,3f), the central fitting (1) being secured to a surface of the frame (6) and the side fittings (2,3) in an opposite surface of the frame (6), such that the frame (6) is arranged between the central fitting (1) and the two side fittings (2,3), such that the lugs (1d,1k) of the central fitting (1) make contact with the lugs (2d,3d) of the side fittings, with all the openings (1e,1j,2e,3e) being aligned in order to house a pin (4) associated with the receiving element secured to the empennage (5).

11 Claims, 5 Drawing Sheets (A-A')

(B-B')

(C-C')

(D-D')

(E-E')

ROTATION FITTING FOR THE EMPENNAGE OF AN AIRCRAFT

CROSS REFERENCE TO RELATED APPLICATIONS

The present application claims priority from Spanish Application Serial No. P200503191, filed on Dec. 26, 2005. Applicants claim priority under 35 U.S.C. §119 as to the said Spanish application, and the entire disclosure of said application is incorporated herein by reference in its entirety.

TECHNICAL FIELD OF THE INVENTION

This invention belongs to the technical field of rotation fittings secured to a fixed element which link a moving element, and more particularly to rotation fittings used in the aeronautical sector, specifically rotation fittings secured to a frame of the fuselage of an aircraft which link a receiving element secured to the empennage of the aircraft.

PRIOR ART OF THE INVENTION

Conventionally, in the prior art, for the case of a horizontal empennage, with adjustable angle of incidence, the reception of the empennage to the fixed structure of the fuselage is done at three points, two rear ones, which define the axis of rotation around which the empennage pivots, and a forward one to which the actuator is hooked with which the rotary movement, and therefore the angle of incidence of the empennage, is regulated.

The linkage at the two rotary points stated above is effected by means of separate rotation fittings joined integrally by means of rivets to the structure of the fuselage and to the empennage respectively, and which are inked together by means of a pin which acts as an axis of rotation.

In the case of rotation fittings secured to the structure of the fuselage, the two structures habitually used are:
  Open frame with a system of bars to provide stiffness, in which the axis of rotation is arranged in the plane of the frame. This system is adequate up to a certain load level, though it is insufficient for transmitting high loads from the empennage to the fuselage.
  Closed or partition frame, used when the loads are so high that the previous structure cannot be used. In this latter case, the fuselage fitting presents an eccentricity with regard to the plane of the frame of the fuselage, which gives rise to the appearance of certain bending loads which the structure has to withstand. Therefore, a series of counter-fittings needs to be provided which implies a extra weight for the structure of the fuselage, in addition to implying a high cost and requiring greater maintenance.

It was therefore desirable to be able to have a system of rotation fittings that would avoid those load eccentricities with regard to the plane of the frame, in such a way that the said bending loads and the need to have to provide the said counter-fittings would be obviated.

DESCRIPTION OF THE INVENTION

The present invention has the aim of overcoming the drawbacks of the receiving fittings existing in the prior art by means of a rotation fitting secured to a fixed element for the linkage of a moving element, particularly and preferably secured to a frame of the fuselage of an aircraft for the linkage of a receiving element of the empennage of the aircraft, said rotation fitting being designed in such a way that, being secured to a closed frame of the fuselage, the axis of rotation of the receiving element of the empennage is located within the plane of that frame with the aim of eliminating the eccentricity of the load with respect to the plane of the frame and therefore eliminating the appearance of the associated bending loads. Owing to the safety requirements demanded of structural elements that are responsible for the safe operation of the aircraft, the rotation fitting includes a central fitting, a first side fitting and a second side fitting with the characteristics that are specified below.

According to the invention, the central fitting is a hollow elongated body with a first end and second end, and which comprises a first side wall and a second side wall joined together by a central wall.

The first side wall of the central fitting has a free edge from which there emerge a first lug with a first opening, and two wings. The first side wing is arranged between the first end of the central fitting and the first lug, and the second side wing is arranged between the second end of the central fitting and the first lug.

In turn, the second side wall also has a free edge from which emerge a second lug with a second opening, along with a third and fourth side wing. The third side wing is arranged between the first end of the central fitting and the second lug, while the fourth side wing is arranged between the second end of the central fitting and the second lug.

The said lugs are coplanar with the side wall from which they emerge, and said side wings extend from the respective side walls outwards, for example, orthogonally.

In accordance with the invention, the first side fitting comprises a first plate with a first end and a second end between which are defined an edge from which emerges a third lug with a third opening coplanar with the first plate. Likewise, laterally emerging from said free edge are a fifth side wing located between the said first end and the third lug along with a sixth side wing located between the second end of the first plate and the third lug.

The second side fitting comprises a second plate with a first end and a second end between which are defined an edge from which emerges a fourth lug coplanar with the second plate and with a fourth opening. Likewise, laterally emerging from said free edge are a seventh side wing located between the said first end and the fourth lug and an eighth side wing located between the second end of the second plate and the fourth lug.

The fittings described above are dimensioned in such a way that when they conform the rotation fitting of the present invention, the four side wings of the unit of the two side fittings are arranged in positions respectively facing the four side wings of the central fitting and separated by a distance corresponding to the thickness of the wing of the frame, the side wings of the side fittings being respectively supported on the forward surface of the core of the frame and the side wings of the central fitting in the rear surface of the core of the frame. In turn, the first lug of the central fitting makes contact with at least the external surface of the third lug of the first side fitting, and the second lug in the central fitting makes contact with at least the external surface of the fourth lug in the second side fitting, in such a way that the openings of the lugs are aligned and permit the housing of a pin which also traverses a hole in the receiving element secured to the empennage in such a way that, by means of the rotation fitting thus arranged, the empennage is duly linked.

The set of the three fittings passes the vertical load of the empennage to the fuselage frame due to a double shear of the receiving pins of the fittings to the frame. Moreover, as there are two lugs on both sides of the empennage fitting, the system is secure against possible failures, which means that in the event of a failure of one of the lugs, the other supports the load without endangering the integrity of the aircraft. Likewise, the central fitting helps to provide stability for the frame.

It is evident that the rotation fitting with the characteristics described above and its assembly contribute towards the stiffness of the fuselage towards torsion, given that it permits the configuration of a closed frame.

The central fitting and/or one or both of the side fittings can be metallic, or manufactured from a resin lamina reinforced with plane carbon fibres to which a pre-form is given which is cured later. Due to tolerance requirements, the most suitable process for the manufacture of this fitting would be RTM (Resin Transfer Moulding). In a preferred embodiment, the central fitting has a transverse section in the form of an Ω in the zones in which the side wings of the frame are found and in the form of an inverted U in the zone of the lugs.

The side fittings can in turn be metallic or manufactured by means of the RTM technology mentioned above. In the case of this fitting, the sections are preferably in the form of an L in the zone in which the respective side wings are found and rectangular in the zone of the lugs.

The rotation fitting of the present invention can be designed in such a way that the first lug also makes contact with the surface of the first plate in addition to the internal surface of the third lug, while the second lug also makes contact with the surface of the second plate in addition to the internal surface of the fourth lug. Likewise, the rotation fitting can be designed in such a way that the third lug also makes contact with the outer surface of the first side wall in addition to making contact with the outer surface of the first lug, and the fourth lug also makes contact with the outer surface of the second side wall in addition to making contact with the outer surface of the second lug.

For reasons of safety and greater securing of the system, the internal surfaces of the side plates making contact with the external surfaces of the central fitting are secured to the latter, preferably being stuck with an adhesive.

Likewise, the securing of the side wings of the fittings to the fuselage frame is preferably done by means of rivets.

BRIEF DESCRIPTION OF THE DRAWINGS

Below, in order to facilitate a better understanding of this specification and forming an integral part thereof, some figures are attached in which, by way of illustration only and not limiting, the object of the invention has been represented in some of its different embodiments.

Figure 1:
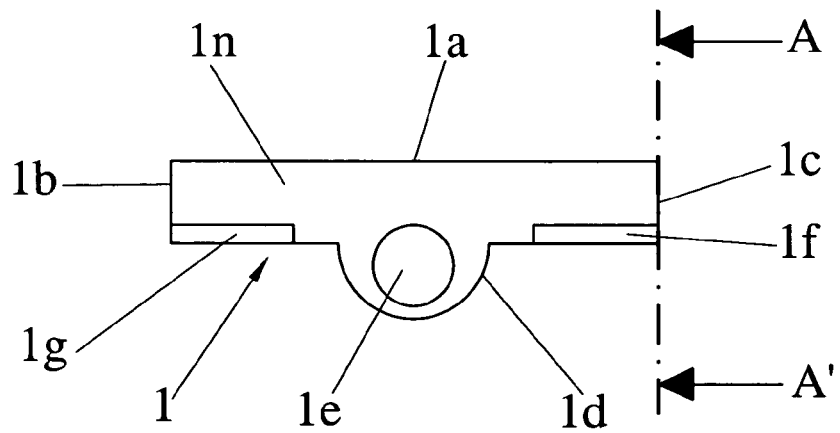
FIG. 1 is a diagrammatic view in side elevation of a central fitting according to an embodiment of the present invention.

Appearing in these figures are numerical references denoting the following elements:

1 central fitting
1a central wall
1b first end of the central fitting
1c second end of the central fitting
1d first lug
1e first opening
1f second side wing
1g first side wing
1h fourth side wing
1i third side wing
1j second opening
1k second lug
1n first side wall
1o second side wall
2 first side fitting
2a first plate
2b first end of the first plate
2c second end of the first plate
2d third lug
2e third opening
2f sixth side wing
2g fifth side wing
3 second side fitting
3a second plate
3b first end of the second plate
3c second end of the second plate
3d fourth lug
3e fourth opening
3f eighth side wing
3g seventh side wing
4 pin
4a first pin adjustment element
4b second pin adjustment element
4c first projection
4d second projection
5 moving element, empennage receiving element
6 fixed element, fuselage frame
7 recess
8 rivets
9 means of joining surfaces, adhesive materials
10 securing means

MODES OF EMBODIMENT OF THE INVENTION

The rotation fitting of the present invention comprises securing means in order to be secured to at least one fixed element 6 and coupling means for linking said rotation fitting to a moving element 5. In particular, a preferred application of the rotation fitting of the present invention is its securing to a frame of the fuselage 6 of an aircraft and, via the coupling means, linking it to a receiving element of the empennage 5 of said aircraft.

The rotation fitting comprises a central fitting 1, a first side fitting 2 and a second side fitting 3.

Figure 2:
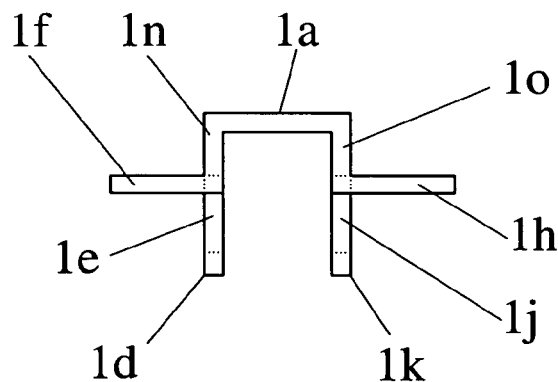
FIG. 2 is a diagrammatic view in front elevation of the central fitting shown in FIG. 1 seen from line A-A'.
Figure 3:
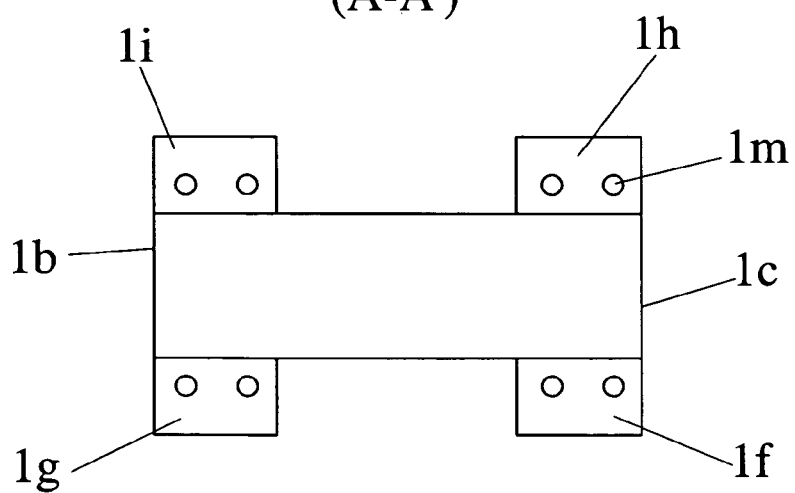
FIG. 3 is a diagrammatic view in upper plan of the central fitting shown in FIG. 1.

FIGS. 1, 2 and 3 show an embodiment of the central fitting 1, which is a hollow elongated body with a first end of the central fitting 1b and a second end 1c of the central fitting 1. As can be seen in FIGS. 1, 2 and 3, between said ends 1b,1c, the central fitting 1 comprises a first side wall 1n and a second side wall 1o joined by a central wall 1a.

Emerging from the first side wall 1n is a first lug 1d coplanar with said first side wall 1n which presents a first opening 1e, and in the same way, emerging from the second side wall 1o is a second lug 1k coplanar with said second side wall 1o which presents a second opening 1j.

In addition, emerging from the first side wall 1n are a first side wing 1g and a second side wing 1f which are extended laterally from the first side wall 1n outwards, the first side wing 1g being arranged between the first end of the central fitting 1b and the first lug 1d, and the second side wing 1f between the first lug 1d and the second end of the central fitting 1c. Symmetrically, emerging from the second side wall 1o are a third side wing 1i and a fourth side wing 1h which are extended laterally from the second side wall 1o outwards, the third side wing 1i being arranged between the first end of the central fitting 1b and the second lug 1k, and the fourth side wing 1h between the second lug 1k and the second end of the central fitting 1c.

Figure 4:
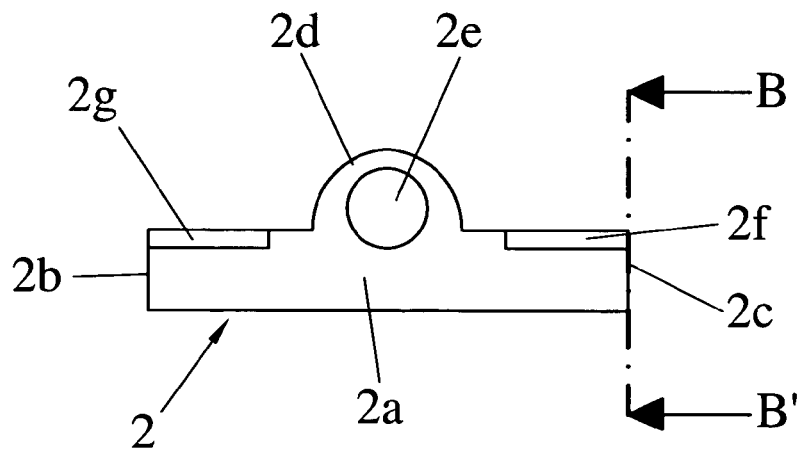
FIG. 4 is a diagrammatic view in side elevation of a first side fitting according to an embodiment of the present invention.
Figure 5:
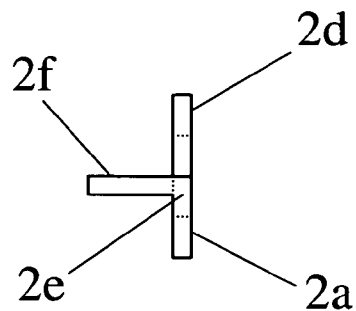
FIG. 5 is a diagrammatic view in front elevation of the first side fitting shown in FIG. 4 seen from line B-B'.
Figure 6:
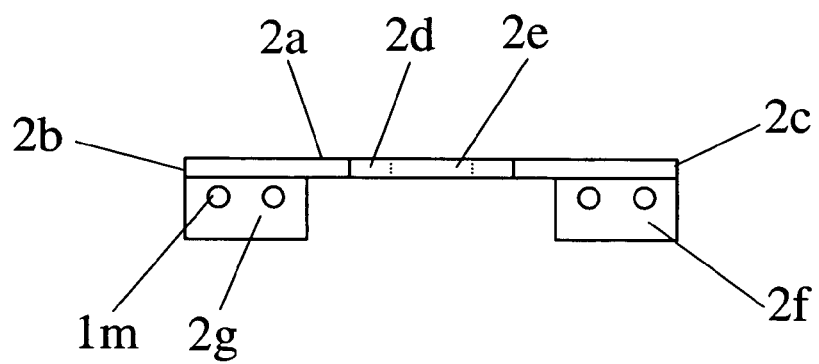
FIG. 6 is a diagrammatic view in upper plan of the first side fitting shown in FIG. 4.

FIGS. 4, 5 and 6 show an embodiment of the first side fitting 2 which comprises a first plate 2a. Said first plate 2a comprises a first end 2b of the first plate 2a and a second end 2c of the first plate 2a, emerging from the surface defined between said ends 2b,2c there being a third lug 2d coplanar with the first plate which presents a third opening 2e, and a fifth side wing 2g and a sixth side wing 2f which are laterally extended from the edge of the first plate 2a outwards, the fifth side wing 2g being arranged between the first end of the first plate 2b and the third lug 2d, and the sixth side wing 2f between the third lug 2d and the second end of the first plate 2c.

Figure 7:
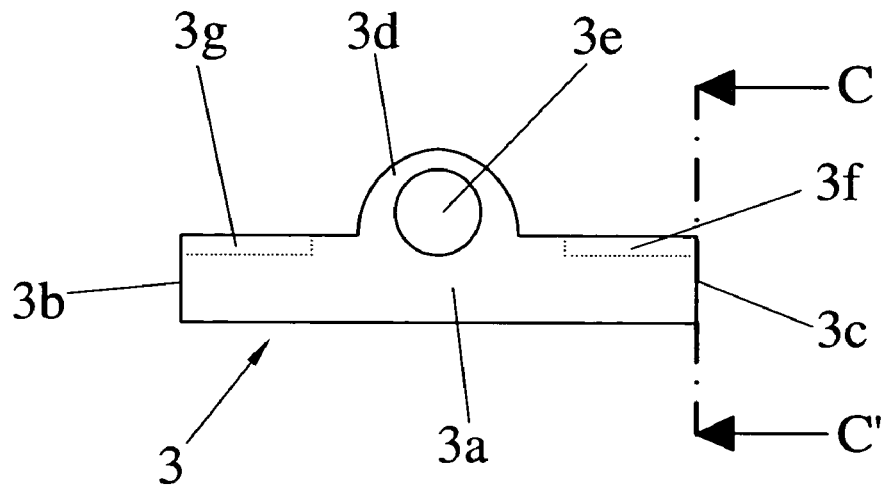
FIG. 7 is a diagrammatic view in side elevation of a second side fitting according to an embodiment of the present invention.
Figure 8:
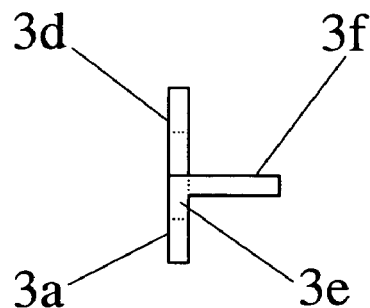
FIG. 8 is a diagrammatic view in front elevation of the second side fitting shown in FIG. 7 seen from line C-C'.
Figure 9:
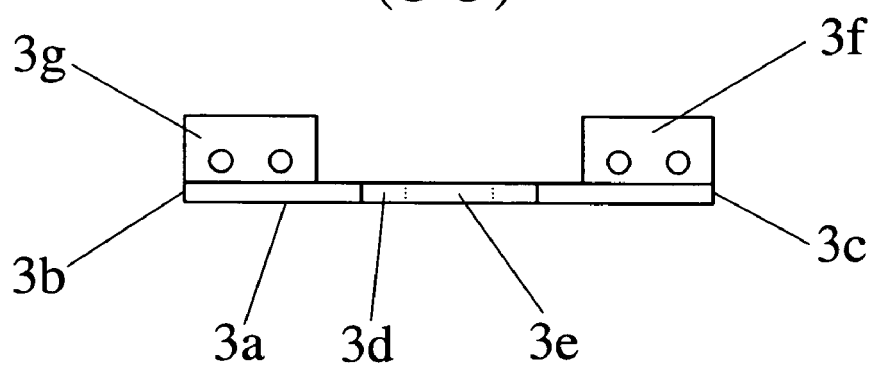
FIG. 9 is a diagrammatic view in upper plan of the second side fitting shown in FIG. 7.
Figure 10:
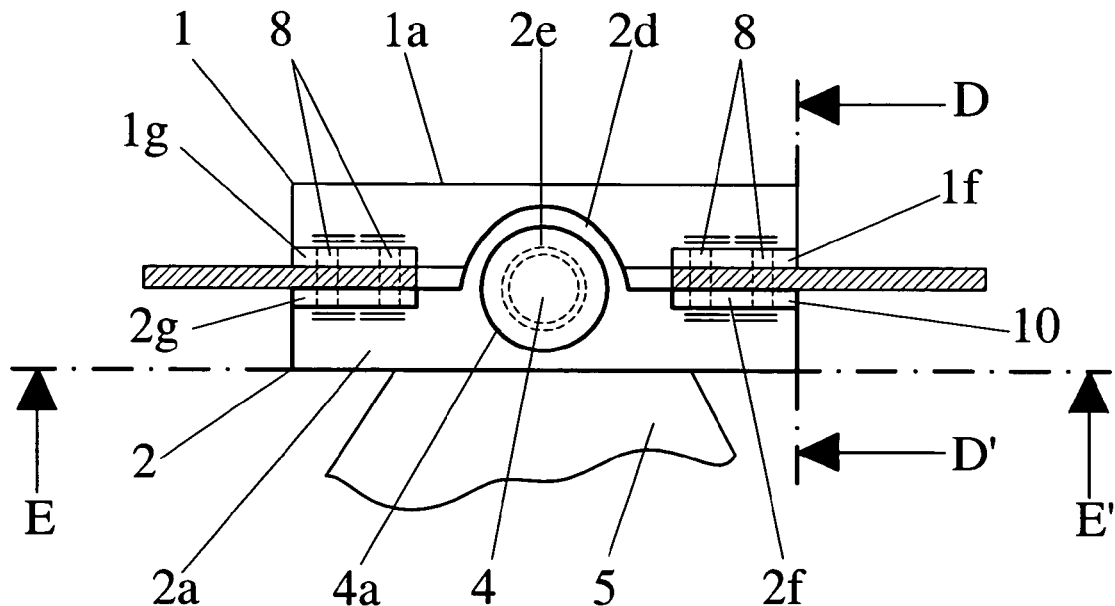
FIG. 10 is a diagrammatic view in side elevation showing the overall assembly of a rotation fitting consisting of the central fitting and the two side fittings shown in the respective figures above, joined to the frame by means of rivets.
Figure 11:
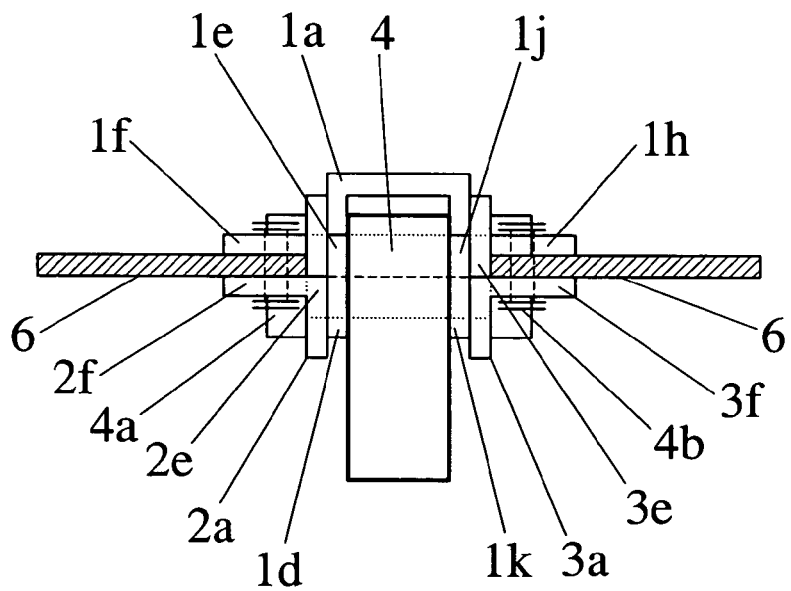
FIG. 11 is a diagrammatic view in front elevation of the rotation fitting shown in FIG. 10 seen from line D-D'.
Figure 12:
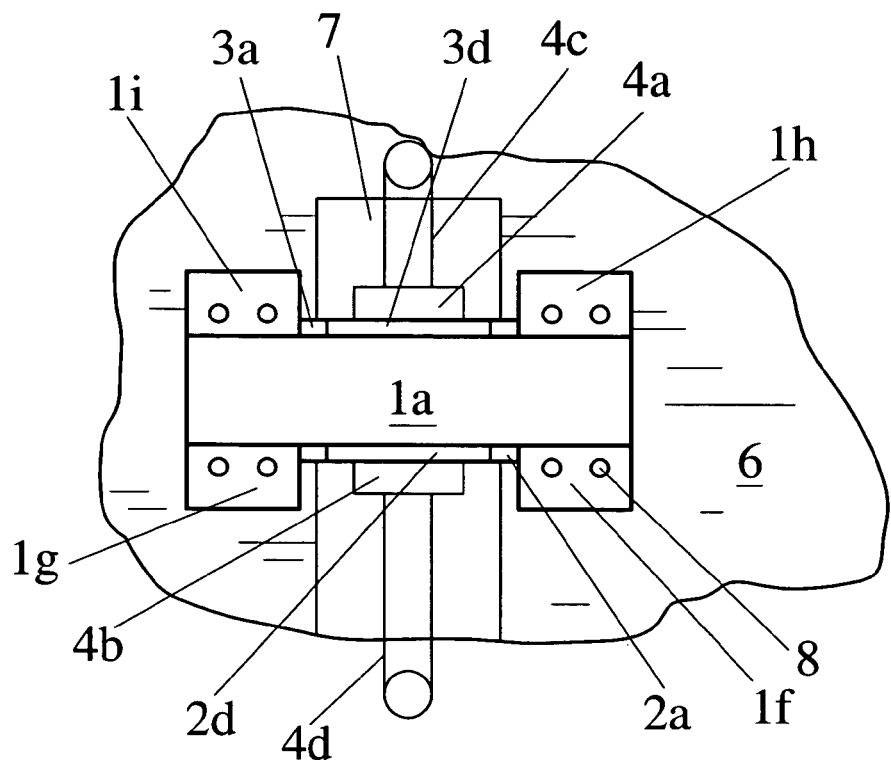
FIG. 12 is a diagrammatic view in upper plan of the side fitting shown in FIG. 10.
Figure 13:
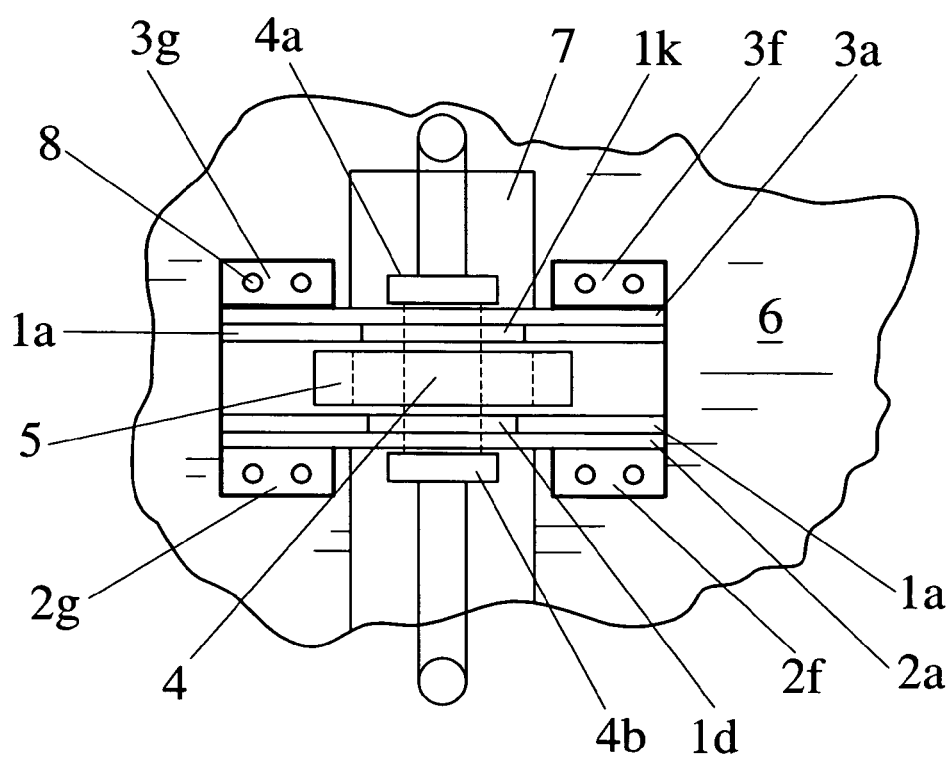
FIG. 13 is a diagrammatic view in lower plan of the rotation fitting shown in FIG. 10 seen from line E-E'.

FIGS. 7, 8 and 9 show an embodiment of the second side fitting 3 which, in a manner symmetric to the above, comprises a second plate 3a. Said second plate 3a comprises a first end 3b of the second plate 3a and a second end 3c of the second plate 3a, emerging from the surface defined between said ends 3b,3c there being a fourth lug 3d coplanar with the second plate 3a which presents a fourth opening 3e, and a seventh side wing 3g and an eighth side wing 3f which are laterally extended from the edge of the second plate 3a outwards, the seventh side wing 3g being arranged between the first end 3b of the second plate 3a and the fourth lug 3d, and the eighth side wing 3f between the fourth lug 3d and the second end 3c of the second plate 3a.

As can be seen in FIGS. 10, 11, 12 and 13, the side wings 1f,1g,1h,1i of the central fitting 1 are secured to a surface of the fuselage frame 6 by securing means 11, and the side wings 2f,2g,3f,3g of the side fittings 2,3 are secured to the opposite surface of the fuselage frame 6 by securing means 11, in such a way that the side wings 1f,1g,1h,1i of the central fitting 1 and the side wings 2f,2g,3f,3g of the side fittings 2,3 are separated from each other by a distance equal to the thickness of the fuselage frame 6, and said fuselage frame 6 is arranged between the side wings 1f,1g,1h,1i of the central fitting 1 and the side wings 2f,2g,3f,3g of the side fittings 2,3.

Likewise, the side wings 1f,1g of the central fitting 1 and the side wings 2f,2g of the first side fitting 2 are arranged in positions respectively facing each other, and the side wings 1h,1i of the central fitting 1 and the side wings 3f,3g of the second side fitting 3 are arranged in positions respectively facing each other.

In addition, the fixed element 6, or more particularly the fuselage frame 6, comprises a recess 7 via which pass the lugs 1d,1k,2d,3d of the fittings 1,2,3 in such a way that the first lug 1d makes contact with at least the outer surface of the third lug 2d, and the second lug 1k makes contact with at least the outer surface of the fourth lug 3d, the openings 1e,2j,2e,3e being aligned in order to house a pin 4 associated with the moving element 5, or more particularly with the receiving element 5 of the aircraft, said empennage receiving element 5 thereby becoming perfectly linked.

In a preferred embodiment of the invention, all the side wings 1f,1g,1h,1i,2f,2g,3f,3g are extended outwards perpendicularly to the surface from which they emerge, this arrangement having the advantage of greater stability and better seating on the surface of the fuselage frame 6.

In said preferred embodiment of the invention, the design of the lugs 1d, 1k, 2d, 3d is such that the first lug 1d and the second lug 1k, as well as making contact with the third lug 2d and fourth lug 3d, also make contact with the surface of the first plate 2a and with the surface of the second plate 3a, respectively, and likewise, the third lug 3d and the fourth lug 1k, as well as making contact with the first lug 1d and second lug 1k, also make contact with the surface of the first side wall 1n and with the surface of the second side wall 1o of the central fitting 1, respectively.

The fittings 1,2,3 of the present invention can be manufactured in metallic materials, or some of them, or the three fittings 1,2,3 can be manufactured in resin reinforced with carbon fibres. The advantage of the embodiment using said materials is the lightness of the array, which prevents additional loads on the fuselage, and at the same time the materials display adequate mechanical strength for withstanding the stresses produced owing to the linkage and movement of the empennage receiving element 5.

In an embodiment of the invention, both the first lug 1d and the third lug 2d, as well as the second lug 1k and the fourth lug 3d, are fixed one to another respectively via means of joining of surfaces 9. In a preferred embodiment of the invention, said means of joining of surfaces 9 consist of adhesive materials 9.

The advantage of these embodiments is the greater stability and securing of the array, since the adhesive material between the lugs 1d,2d and 1k,3d permit their immobilisation, preventing the openings 1e,2j,2e,3e from becoming out of alignment and producing undesired stresses on them by the pin 4.

Moreover, in a preferred embodiment, the pin 4 linking the empennage receiving element 5 to the rotation fitting includes in one of its ends a first projection 4c and a first adjustment element 4a and at its other end a second projection 4d and a second adjustment element 4b.

The second projection 4d of the pin will be connected to the side load fitting of the empennage, for which the recess 7 of the frame 6 presents suitable dimensions for the passage of said second projection 4d. The other end of the pin terminating in the first projection 4c will be connected to the frame 6, via which it will transmit the side load of the empennage to the fuselage.

By means of the adjustment elements of the pin 4a and 4b and the pertinent conventional system of bushings, it is guaranteed that no transverse loads appear in the lugs of the fittings due to the actual assembly or during the operation of the aircraft.

In a preferred embodiment of the invention, the securing means 10 of the side wings 1f,1g,1h,1i,2f,2g,3f,3g to the fuselage frame 6 comprise at least one opening for rivets 1*m* in each one of said side wings 1*f*,1*g*,1*h*,1*i*,2*f*,2*g*,3*f*,3*g* and in the fuselage frame 6 in the zone where the latter are joined, said holes for rivets 1*m* being traversed by rivets 8 complementary to them.

The advantage of this embodiment of the securing means of 10 is the simplicity of manufacture and operation, at the same time as the high degree of safe securing they provide.

The invention claimed is:

1. Rotation fitting comprising securing means for being secured to at least one fixed element and coupling means for linking said rotation fitting to a moving element, wherein the rotation fitting comprises a central fitting, a first side fitting and a second side fitting;

said central fitting is a hollow elongated body comprising a first end of the central fitting and a second end of the central fitting, between which said central fitting comprises a first side wall from which emerge a first lug coplanar with the first side wall, which comprises a first opening, a first side wing which is extended laterally from the first side wall outwards, arranged between said first end of the central fitting and said first lug, a second side wing which is extended laterally from the first side wall outwards, arranged between said second end of the central fitting and said first lug, a second side wall from which emerge a second lug coplanar with the second side wall, which comprises a second opening, a third side wing which is extended laterally from the second side wall outwards, arranged between said first end of the central fitting and said second lug, a fourth side wing which is extended laterally from the second side wall outwards, arranged between said second end of the central fitting and said second lug, and a central wall which joins said side walls;

in that said first side fitting comprises a first plate, which comprises a first end of the first plate and a second end of the first plate between which is defined a surface from which emerge a third lug coplanar with the first plate, which comprises a third opening, a fifth side wing which is extended laterally from an edge of the first plate outwards, arranged between said first end of the first plate and said third lug, and a sixth side wing which is extended laterally from said edge of the first plate outwards, arranged between said second end of the first plate and said third lug;

said first second fitting comprises a second plate, which comprises a first end of the second plate and a second end of the second plate between which is defined a surface from which emerge a fourth lug coplanar with the second plate, which comprises a fourth opening, a seventh side wing which is extended laterally from an edge of the second plate outwards, arranged between said first end of the second plate and said fourth lug, and an eighth side wing which is extended laterally from said edge of the second plate outwards, arranged between said second end of the second plate and said fourth lug;

the side wings of the central fitting are secured to a surface of the fixed element and the side wings of the side fittings are secured to the opposite surface of the fixed element, the fixed element being arranged between the central fitting and the set of side fittings via securing means in such a way that the side wings of the central fitting and the side wings of the first side fitting are arranged in positions respectively facing each other, and the side wings of the central fitting and the side wings of the second side fitting are arranged in positions respectively facing each other, and the fixed element comprises a recess via which pass the lugs of the fittings in such a way that the first lug makes contact with at least the outer surface of the third lug, and the second lug makes contact with at least the outer surface of the fourth lug, and the openings are aligned in order to house a pin associated with the moving element.

2. Rotation fitting according to claim 1, wherein the first lug also makes contact with the surface of the first plate and the second lug also makes contact with the surface of the second plate.

3. Rotation fitting according to claim 1, wherein the third lug also makes contact with the surface of the first side wall of the central fitting 1, and the fourth lug also makes contact with the surface of the second side wall of the central fitting 1.

4. Rotation fitting according to claim 1, wherein the central fitting is made of resin reinforced with carbon fibres.

5. Rotation fitting according to claim 1, wherein the first side fitting is made of resin reinforced with carbon fibres.

6. Rotation fitting according to claim 1, wherein the second side fitting is made of resin reinforced with carbon fibres.

7. Rotation fitting according to claim 1, wherein the first lug is fixed to at least the outer surface of the third lug and the second lug is fixed to at least the outer surface of the fourth lug, these securings being made by means of joining of surfaces.

8. Rotation fitting according to claim 7, wherein said means of joining of surfaces are adhesive materials.

9. Rotation fitting according to claim 1, wherein the pin comprises at one of its ends a first adjustment element and a first projection, and at its other end a second adjustment element and a second projection.

10. Rotation fitting according to claim 1, wherein the securing means securing the side wings to the fixed element comprise at least one opening for rivets in each one of said side wings and in the fixed element, said holes for rivets being traversed by rivets complementary to them.

11. Rotation fitting according to claim 1, wherein the fixed element is a fuselage frame of an aircraft, and the moving element linked to said rotation fitting is a receiving element of the empennage of said aircraft.

* * * * *